United States Patent
Ryon et al.

(10) Patent No.: US 10,436,448 B2
(45) Date of Patent: Oct. 8, 2019

(54) INJECTOR FITTINGS

(71) Applicant: Delavan Inc, West Des Moines, IA (US)

(72) Inventors: Jason A. Ryon, Carlisle, IA (US); Brett A. Pfeffer, Waukee, IA (US); Mark A. Caples, Ankeny, IA (US); Daniel E. Bleeker, Ankeny, IA (US)

(73) Assignee: Delavan Inc., West Des Moines, IA (US)

( * ) Notice: Subject to any disclaimer, the term of this patent is extended or adjusted under 35 U.S.C. 154(b) by 955 days.

(21) Appl. No.: 14/971,339

(22) Filed: Dec. 16, 2015

(65) Prior Publication Data

US 2017/0176010 A1     Jun. 22, 2017

(51) Int. Cl.
 *F23R 3/28*   (2006.01)
 *F02C 7/22*   (2006.01)

(52) U.S. Cl.
 CPC .............. *F23R 3/283* (2013.01); *F02C 7/222* (2013.01); *F05D 2220/32* (2013.01); *F05D 2230/237* (2013.01); *F05D 2230/30* (2013.01); *F05D 2250/281* (2013.01); *F23D 2900/14641* (2013.01); *F23R 2900/00012* (2013.01)

(58) Field of Classification Search
 CPC .... F23R 3/283; F23R 3/28; F02C 7/22; F02C 7/222
 See application file for complete search history.

(56) References Cited

U.S. PATENT DOCUMENTS

| 5,279,112 A | 1/1994 | Halila |
| 6,276,141 B1 | 8/2001 | Pelletier |
| 9,267,689 B2 * | 2/2016 | Wiebe ..................... F02C 7/222 |
| 2010/0307161 A1 * | 12/2010 | Thomson .............. F23D 11/107 60/748 |

FOREIGN PATENT DOCUMENTS

| EP | 2719953 A2 | 4/2014 | |
| FR | 2227436 A1 * | 11/1974 | ............... F23R 3/20 |
| FR | 2227436 A1 | 11/1974 | |
| WO | WO-2014137696 A2 | 9/2014 | |
| WO | WO-2014210402 A1 | 12/2014 | |
| WO | WO-2015012908 A2 | 1/2015 | |

OTHER PUBLICATIONS

Extended European Search Report issued by Examiner Enrico Coli, of the European Patent Office, dated May 15, 2017 in corresponding European Patent Application No. 16202593.6.

* cited by examiner

*Primary Examiner* — Craig Kim
(74) *Attorney, Agent, or Firm* — Locke Lord LLP; Scott D. Wofsy; Joshua L. Jones

(57) ABSTRACT

An injector includes a feed arm extending from an inlet fitting to a nozzle body opposite the inlet fitting. The nozzle body includes a spray outlet in fluid communication with the inlet fitting for issuing a spray of fluid supplied at the inlet fitting. The inlet fitting of the feed arm includes a receptacle therein for receiving a fluid supply manifold inside the inlet fitting of the feed arm.

13 Claims, 6 Drawing Sheets

INJECTOR FITTINGS

BACKGROUND OF THE INVENTION

1. Field of the Invention

The present disclosure relates to manifolds, injectors, and more particularly to fittings for connecting manifolds and injectors such as used in gas turbine engines.

2. Description of Related Art

Fittings to connect fuel manifolds to fuel nozzles and injectors in gas turbine engines can account for a substantial portion of the weight of a fuel system. Traditional fittings also are a limiting factor in engine design, since the space taken up by the fittings limits the minimum diameter for other engine components. This means engine cases are made larger than otherwise needed in order to accommodate the injector or nozzle fittings. Large cases add to the drag on an aircraft and therefore limit fuel efficiency.

While conventional methods and systems have generally been considered satisfactory for their intended purpose, there is still a need in the art for improved injector and nozzle fittings, e.g., with reduced size and or weight relative to conventional fittings. The present disclosure provides a solution for this need.

SUMMARY OF THE INVENTION

An injector includes a feed arm extending from an inlet fitting to a nozzle body opposite the inlet fitting. The nozzle body includes a spray outlet in fluid communication with the inlet fitting for issuing a spray of fluid supplied at the inlet fitting. The inlet fitting of the feed arm includes a receptacle therein for receiving a fluid supply manifold inside the inlet fitting of the feed arm.

The receptacle can include internal threads configured to be threaded to corresponding threads for securing an outlet end of a fluid supply manifold in the receptacle. A mounting flange can extend radially outward from the inlet fitting of the feed arm for mounting the feed arm to a supporting structure. The receptacle of the inlet fitting can be between the mounting flange and the nozzle body lengthwise along the feed arm. The internal threads can be within the feed arm between the mounting flange and the nozzle body lengthwise along the feed arm.

The receptacle can include at least one seal for sealing against an outlet end of a fuel supply manifold in the receptacle. The receptacle can include a flared seal surface, e.g., wherein the flared seal surface flares in at least one direction including radially inward or radially outward. The receptacle can be connected to the feed arm by at least one of brazing or additive manufacturing. The receptacle can be connected to the feed arm by a flexure beam.

A fluid delivery assembly includes a fluid supply manifold and an injector as described herein, wherein an outlet end the fluid supply manifold is engaged within the receptacle of the feed arm. A threaded nut can be disposed about the fluid supply manifold. The outlet end of the fluid supply manifold can define an enlargement configured to prevent relative axial movement of the threaded nut beyond the outlet end of the fluid supply manifold. The receptacle of the feed arm can include internal threads threaded to corresponding threads of the threaded nut for securing the outlet end of the fluid supply manifold in the receptacle. The threaded nut can include a flange external from the receptacle with engagement surfaces configured to engage a tool for rotating the threaded nut to engage or disengage the threads in the receptacle of the feed arm.

A fuel manifold assembly for a gas turbine engine includes a fuel supply manifold and a threaded nut disposed about the fuel supply manifold as described above. The threaded nut defines external threads proximate the enlargement of the fuel supply manifold configured to engage with internal threads of a receptacle of a fuel injector feed arm. The enlargement of the outlet end of the fuel supply manifold can define a flared sealing surface configured to seal against a corresponding sealing surface in a receptacle of an injector feed arm. The enlargement of the outlet end of the fuel supply manifold can define a cylindrical, outward facing sealing surface configured to seal against a corresponding sealing surface in a receptacle of an injector feed arm.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
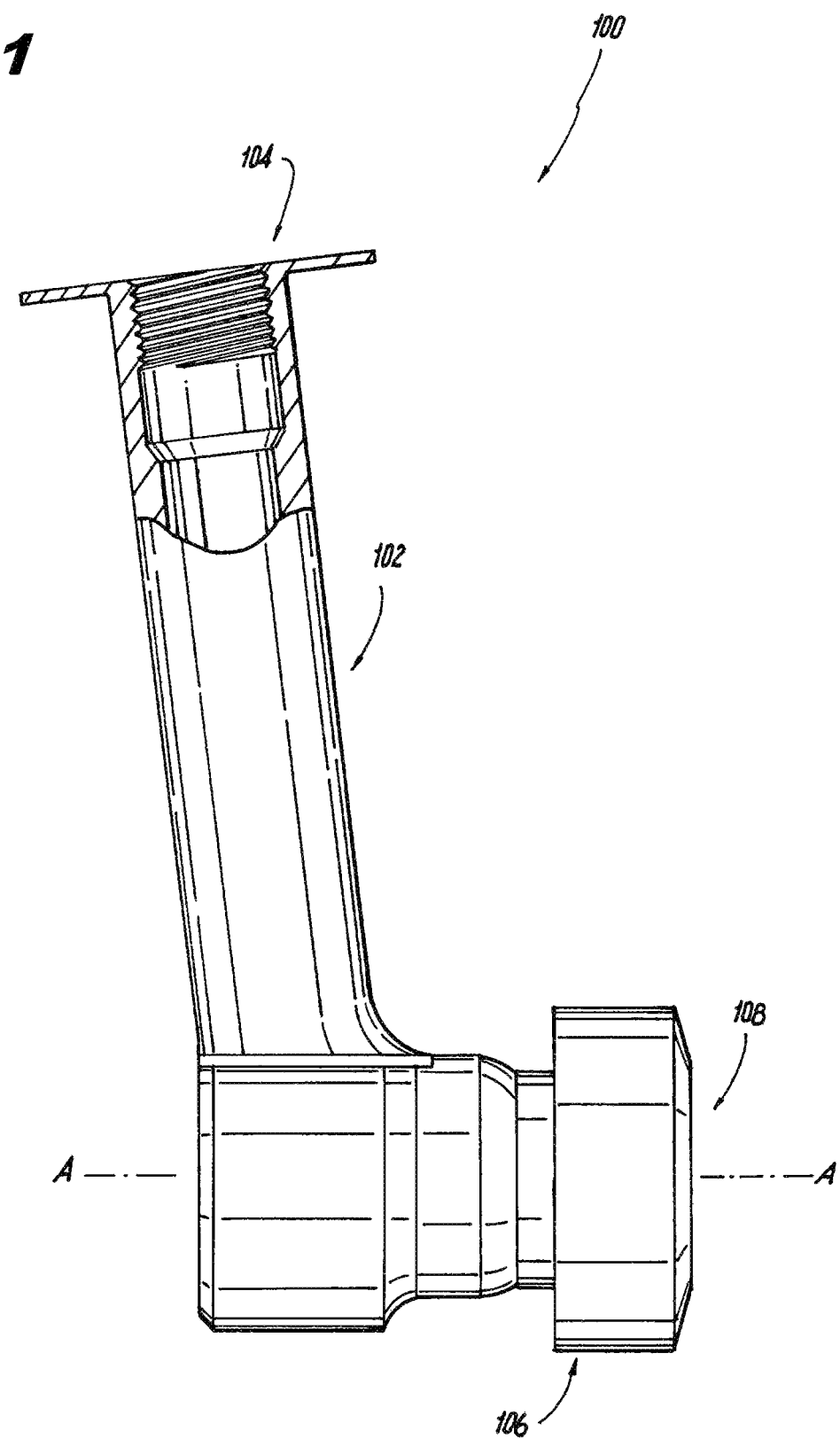
FIG. 1 is a partial cross-sectional elevation view of an exemplary embodiment of an injector constructed in accordance with the present disclosure, showing the inlet fitting.

Reference will now be made to the drawings wherein like reference numerals identify similar structural features or aspects of the subject disclosure. For purposes of explanation and illustration, and not limitation, a partial view of an exemplary embodiment of an injector in accordance with the disclosure is shown in FIG. 1 and is designated generally by reference character 100. Other embodiments of injectors in accordance with the disclosure, or aspects thereof, are provided in FIGS. 2-8, as will be described. The systems and methods described herein can be used for fuel systems in gas turbine engines, or any other suitable fluid delivery system, e.g., where a manifold is connected to injectors or other fluid delivery components.

Injector 100 includes a feed arm 102 extending from an inlet fitting 104 to a nozzle body 106 opposite the inlet fitting 104. The nozzle body 106 includes a spray outlet 108 in fluid communication with the inlet fitting 104 for issuing a spray of fluid supplied at the inlet fitting 104.

Figure 2:
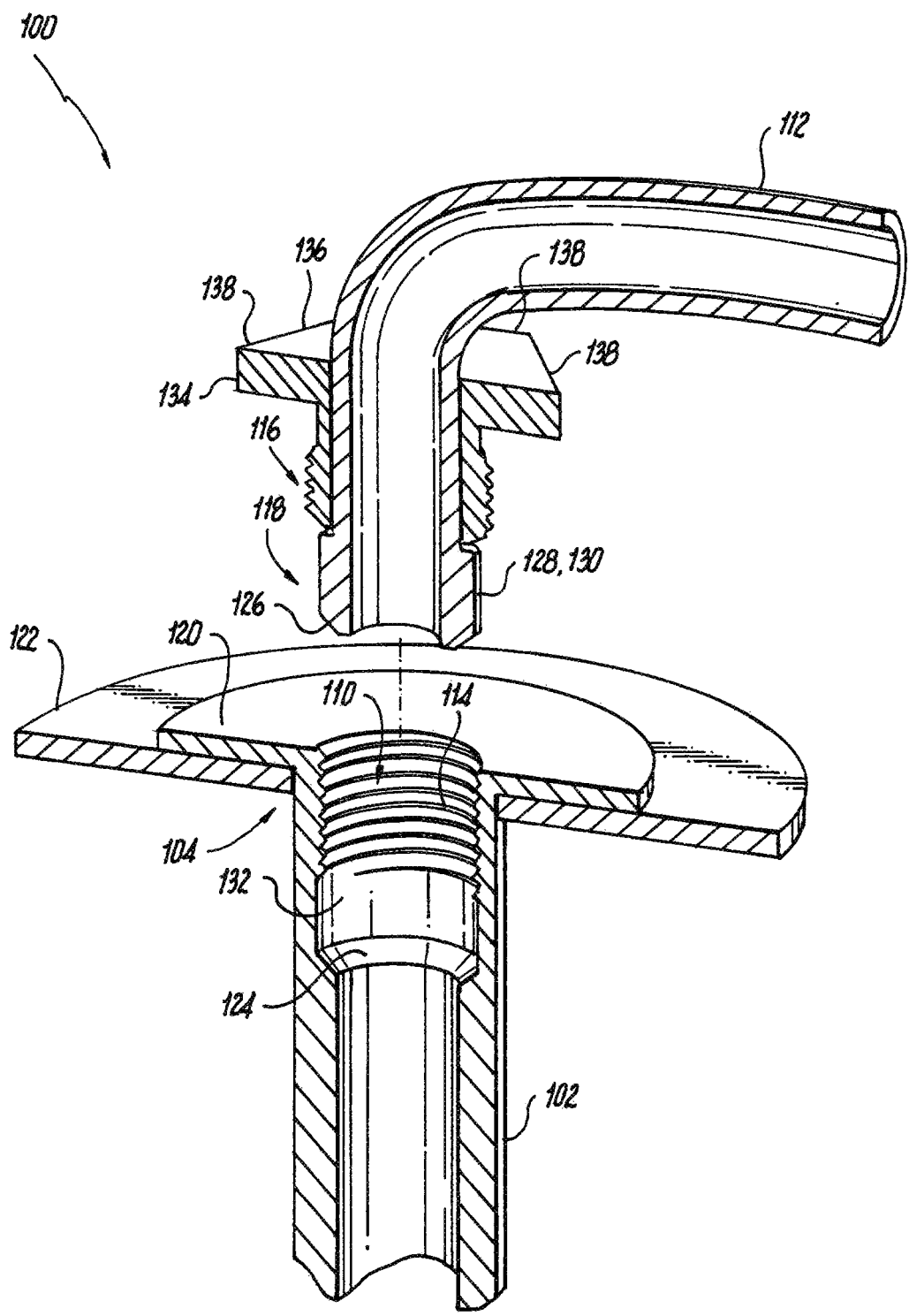
FIG. 2 is a cross-sectional exploded perspective view of the injector of FIG. 1 and an exemplary embodiment of a manifold assembly constructed in accordance with the present disclosure.

With reference now to FIG. 2, the inlet fitting 104 of the feed arm 102 includes a receptacle 110 therein for receiving a fluid supply manifold 112 inside the inlet fitting 104 of the feed arm. The receptacle 110 includes internal threads 114 configured to be threaded to corresponding threads 116 for securing an outlet end 118 of fluid supply manifold 112 in the receptacle 110. A mounting flange 120 extends radially outward from the inlet fitting 104 of the feed arm 102 for mounting the feed arm 102 to a supporting structure 122, e.g., an engine case. The receptacle 110 and the internal threads 114 of the inlet fitting 104 are within the feed arm 102 between the mounting flange 120 and the nozzle body 106 (shown in FIG. 1) lengthwise along the feed arm 102.

Figure 3:
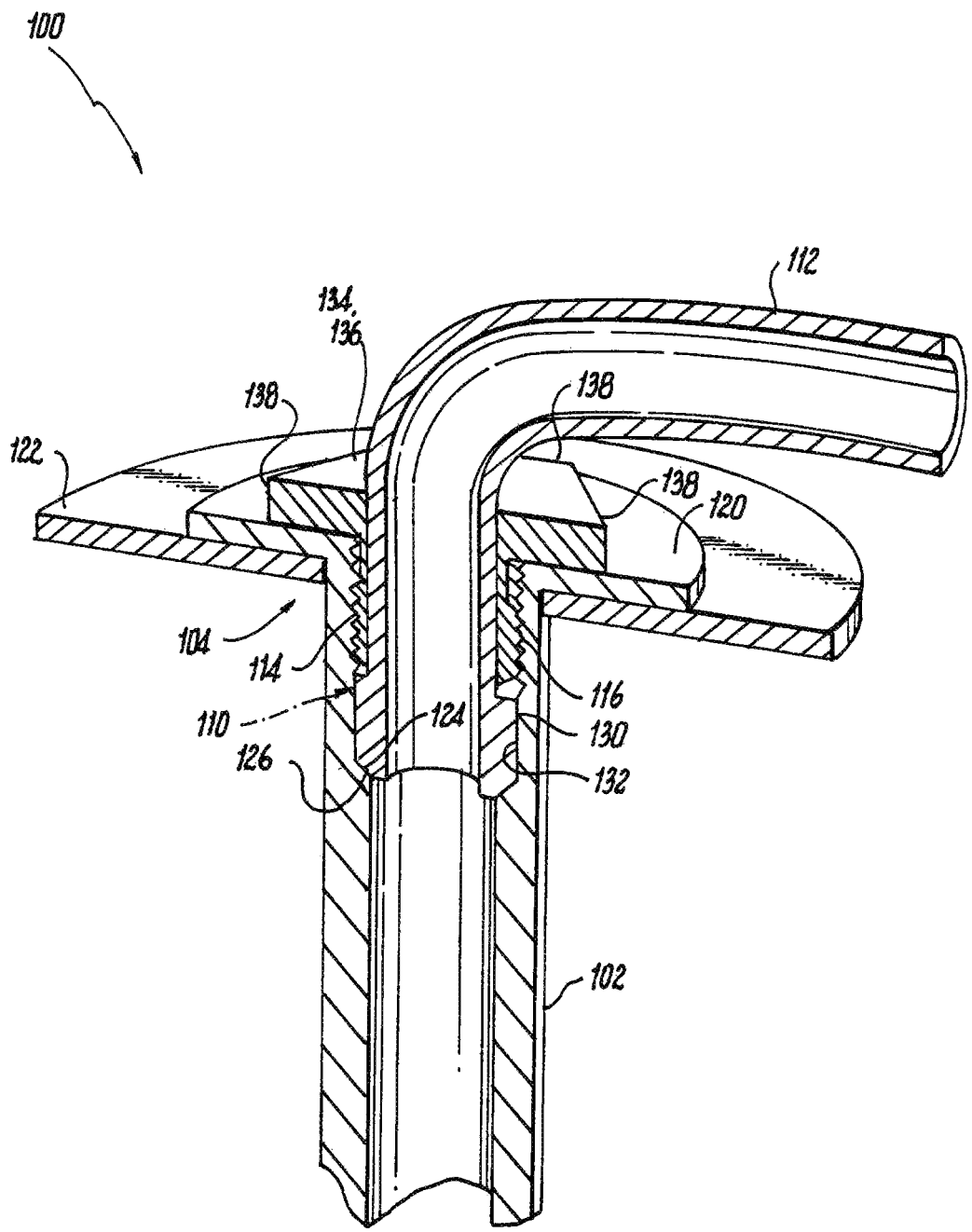
FIG. 3 is a cross-sectional perspective view of the injector and manifold assembly of FIG. 2 assembled together as a fluid delivery assembly.
Figure 4:
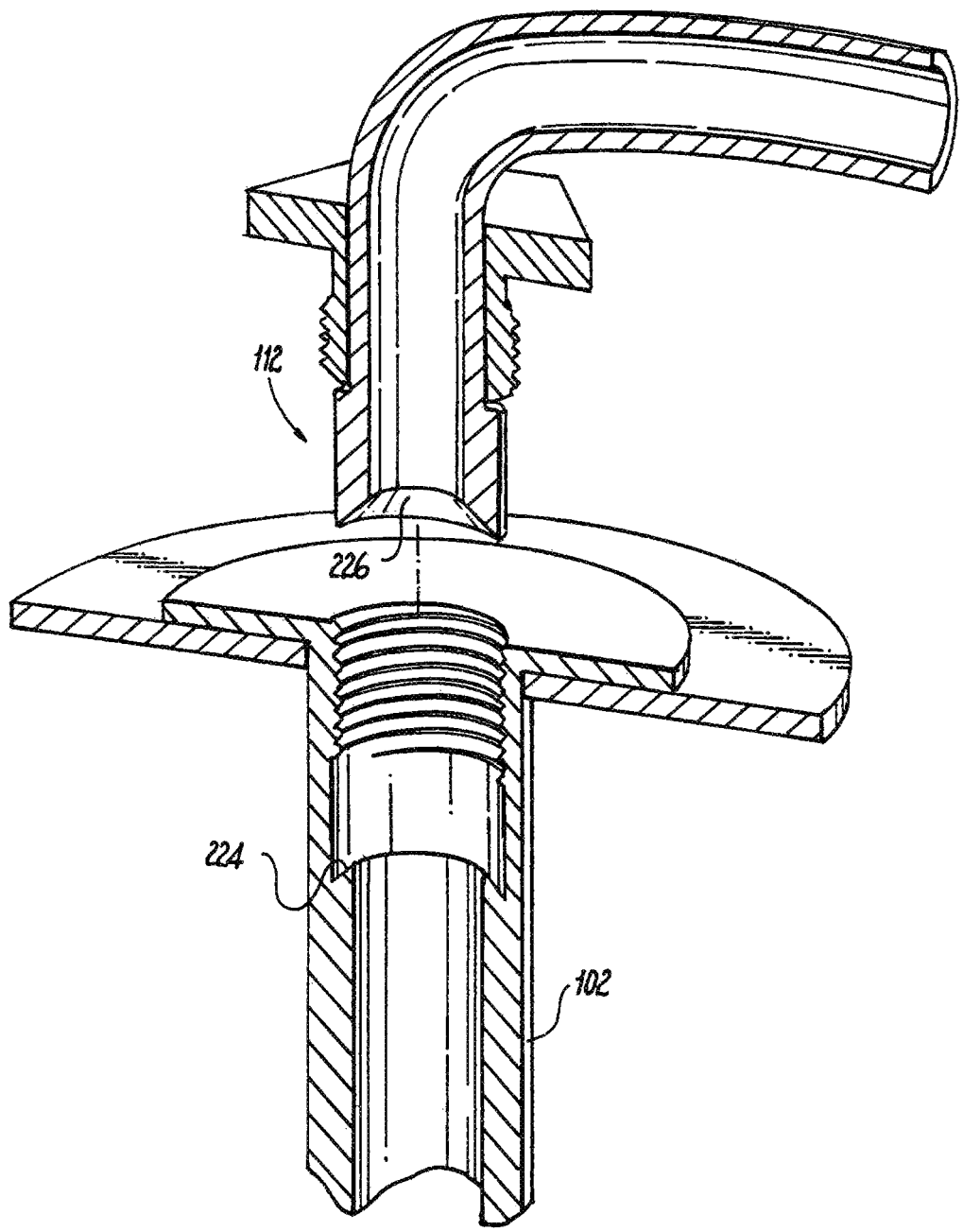
FIG. 4 is a cross-sectional perspective view of another exemplary embodiment of a fluid delivery assembly constructed in accordance with the present disclosure, showing a flared seal wherein the flare direction is opposite that shown in FIG. 3.

The receptacle 110 includes at least one seal for sealing against the outlet end 118 of the fuel supply manifold 112 in the receptacle 110. The receptacle 110 includes a flared seal surface 124. The outlet end of the fluid supply manifold defines an enlargement 128 with a corresponding flared sealing surface 126. As shown in FIG. 3, when fluid supply manifold 112 and feed arm 102 are assembled together, the flared sealing surfaces 124 and 126 engage one another to seal fluid within the internal passage formed inside fluid supply manifold 112 and feed arm 102. As shown in FIG. 4, the flare direction of the flaring of the sealing surface 124 can be reversed from radially inward to be radially outward facing, as is sealing surface 224 of feed arm 102 in FIG. 4, and the corresponding sealing surface 226 of manifold 112 is flared in the opposite direction as well. Referring again to FIG. 2, the enlargement 128 of the outlet end 118 of the fuel supply manifold 112 defines a cylindrical, outward facing sealing surface 130 configured to seal against a corresponding sealing surface 132 in the receptacle 110 of feed arm 102. Any of surfaces 124, 224, 126, 226, 130, and 132 can include any suitable sealing features such as o-rings or the like to ensure proper sealing.

A threaded nut 134 is disposed about the fluid supply manifold 112. The enlargement 128 of the outlet end 118 of the fluid supply manifold 112 is configured to prevent relative axial movement of the threaded nut 134 beyond the outlet end 118 of the fluid supply manifold 112. The external threads 116 of the threaded nut are proximate the enlargement 128 of the fluid supply manifold 112. The enlargement 128 of fluid supply manifold 112 is captive within receptacle 110 when the threads 114 and 116 are threaded together, thus securing the outlet end 118 of the fluid supply manifold 112 in the receptacle 110. The threaded nut 134 includes a flange 136 external from the receptacle 110 with engagement surfaces 138, e.g., arranged in a hexagon, configured to engage a tool, e.g., a hexagon wrench, for rotating the threaded nut 134 to engage or disengage the threads 116 in the receptacle 110 of the feed arm 102. Fluid supply manifold 112 together with threaded nut 134, as well as optionally other components, form a fuel manifold assembly, e.g., for a gas turbine engine wherein the fluid supply manifold 112 is a fuel supply manifold and injector 100 is a fuel injector. Altogether, the fluid supply manifold 112, threaded nut 134, and injector 100 form part of a fluid delivery assembly, optionally with additional similar injectors, manifold outlets, and threaded nuts, e.g., for supplying fuel form a source such as a fuel tank to a combustor of a gas turbine engine. Those skilled in the art will readily appreciate that fuel delivery in gas turbine engines is provided herein as an exemplary application, and that systems and methods as described herein can be used in any other suitable application.

Figure 5:
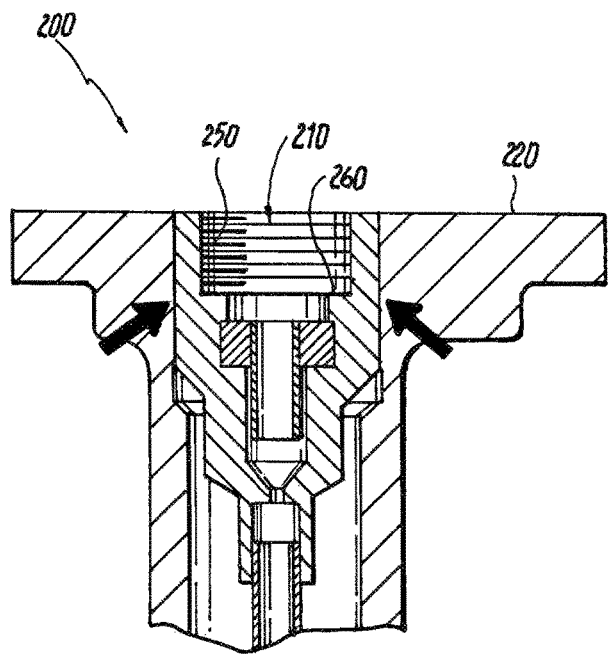
FIGS. 5-8 are cross-sectional side elevation views of four exemplary embodiments of injectors constructed in accordance with the subject invention, each showing a respective embodiment of connection between the feed arm and the receptacle for connecting the injector to a manifold.
Figure 6:
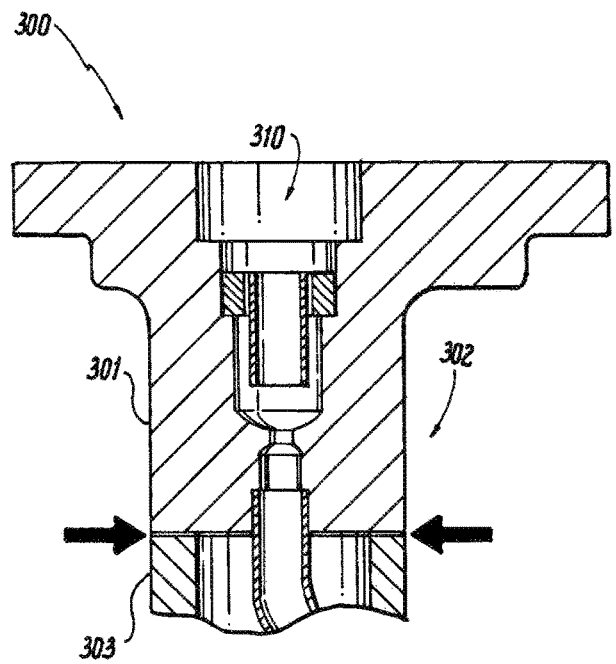
Figure 7:
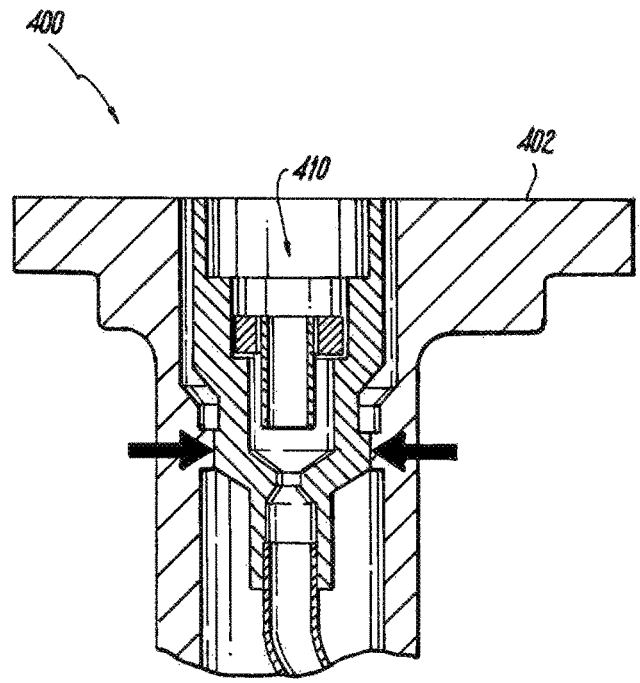
Figure 8:
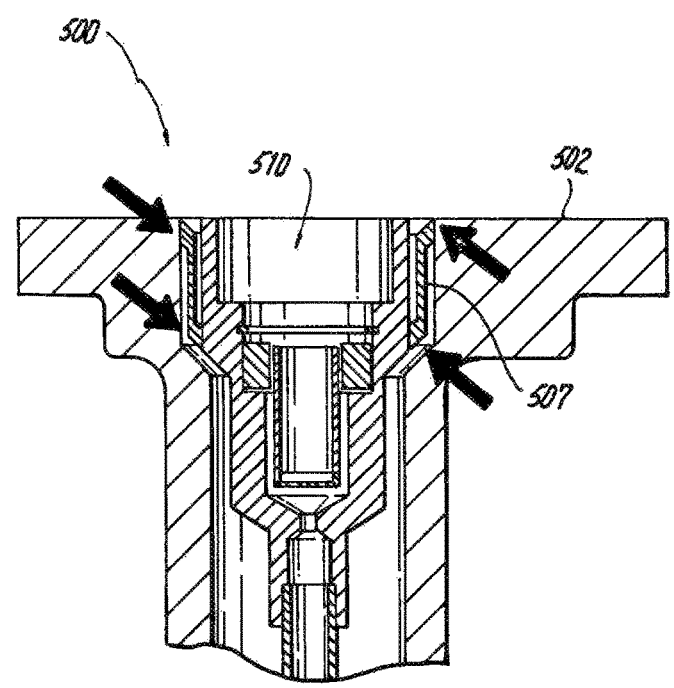

With reference now to FIG. 5, another embodiment of injector 200 is shown, wherein the receptacle 210, similar to receptacle 110 described above, is joined within feed arm 202, where the joints are indicated in FIG. 5 with the large arrows. In FIG. 6, an exemplary example of an injector 300 including a receptacle 310, similar to receptacle 110 described above, is shown, wherein the receptacle 310 is integral with an upper portion 301 of feed arm 302, which is joined to the lower portion of feed arm 302 at a joint indicated by the large arrows in FIG. 6. FIG. 7 shows another example of an injector 400 with a receptacle 401, similar to receptacle 110 described above, joined to the feed arm 402 at the joint indicated by the large arrows in FIG. 7. In FIG. 8, injector 500 is shown, including a receptacle 510 much as those described above, wherein the receptacle is connected to the feed arm 502 by a flexure beam 507. The flexure beam is joined to the receptacle 510 and to the feed arm 502 at the joints indicated by large arrows in FIG. 8. The different connection configurations shown in FIGS. 5-8 may be suitable for different applications. For example, the joints in FIGS. 7 and 8 are remote from the seal locations, and allow for thermal isolation between cool fluids delivered through the manifold and potentially extreme heat outside the feed arm. The example in FIG. 8 also allows for tolerance of high torque, if required for example to tighten a threaded nut such as described above.

It is contemplated that a receptacle in accordance with this disclosure can be formed integrally with a feed arm, e.g., by additive manufacturing, conventional machining or any other suitable process, as in FIG. 1. It is also contemplated that a combination of integrally forming and brazing can be used, as in FIG. 6, wherein receptacle 310 is connected to the feed arm by being integrally formed with upper portion 301, which is in turn joined to lower portion 303 of feed arm 302. In FIGS. 5-8, the seal location can be along the faces that engage a manifold axially, as indicated in FIG. 5 by reference character 260, which can optionally be flared as described above with respect to FIGS. 2-3. Surface 250 in FIG. 5 is threaded for engaging a manifold such as manifold 112 described above, and similar threads are included in FIGS. 6-8.

The methods and systems of the present disclosure, as described above and shown in the drawings, provide for fluid delivery systems such as fuel injectors and manifolds with superior properties including low profile fittings for reduced weight and/or size, as well as potentially reduced part count relative to traditional fittings. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An injector comprising:
a feed arm extending from an inlet fitting to a nozzle body opposite the inlet fitting, wherein the nozzle body includes a spray outlet in fluid communication with the inlet fitting for issuing a spray of fluid supplied at the inlet fitting, wherein the inlet fitting of the feed arm includes a receptacle therein for receiving a fluid supply manifold inside the inlet fitting of the feed arm, wherein the receptacle includes internal threads configured to be threaded to corresponding threads of a fluid supply manifold for securing an outlet end of the fluid supply manifold in the receptacle, wherein the receptacle includes at least one seal for sealing against an outlet end of the fuel supply manifold in the receptacle, wherein the at least one seal is between the nozzle body and the internal threads.

2. The injector as recited in claim 1, further comprising a mounting flange extending radially outward from the inlet fitting of the feed arm for mounting the feed arm to a supporting structure.

3. The injector as recited in claim 2, wherein the receptacle of the inlet fitting is between the mounting flange and the nozzle body lengthwise along the feed arm.

4. The injector as recited in claim 3, wherein the internal threads are within the feed arm between the mounting flange and the nozzle body lengthwise along the feed arm.

5. The injector as recited in claim 1, wherein the receptacle includes a flared seal surface, wherein the flared seal surface flares in at least one direction including radially inward or radially outward.

6. The injector as recited in claim 1, wherein the receptacle is connected to the feed arm by at least one of brazing or additive manufacturing.

7. The injector as recited in claim 1, wherein the receptacle is connected to the feed arm by a flexure beam.

8. A fluid delivery assembly comprising:
a fluid supply manifold; and
an injector as recited in claim 1, wherein an outlet end the fluid supply manifold is engaged within the receptacle of the feed arm.

9. The fluid delivery assembly as recited in claim 8, further comprising:
a threaded nut disposed about the fluid supply manifold, wherein the outlet end of the fluid supply manifold defines an enlargement configured to prevent relative axial movement of the threaded nut beyond the outlet end of the fluid supply manifold.

10. The fluid delivery assembly as recited in claim 8, wherein the threaded nut includes a flange external from the receptacle with engagement surfaces configured to engage a tool for rotating the threaded nut to engage or disengage the threads in the receptacle of the feed arm.

11. A fuel manifold assembly for a gas turbine engine comprising:
a fuel supply manifold; and
a threaded nut disposed about the fuel supply manifold, wherein an outlet end of the fuel supply manifold defines an enlargement configured to prevent relative axial movement of the threaded nut beyond the outlet end of the fuel supply manifold, wherein the threaded nut defines external threads proximate the enlargement of the fuel supply manifold configured to engage with internal threads of a receptacle of a fuel injector feed arm, wherein the enlargement includes a seal for sealing with the receptacle of the fuel injector, wherein the seal is positioned to be between the threaded nut and a nozzle body of the fuel injector.

12. A manifold assembly as recited in claim 11, wherein the enlargement of the outlet end of the fuel supply manifold defines a flared sealing surface configured to seal against a corresponding sealing surface in a receptacle of an injector feed arm.

13. A manifold assembly as recited in claim 11, wherein the enlargement of the outlet end of the fuel supply manifold defines a cylindrical, outward facing sealing surface configured to seal against a corresponding sealing surface in a receptacle of an injector feed arm.

* * * * *